Patented Oct. 10, 1922.

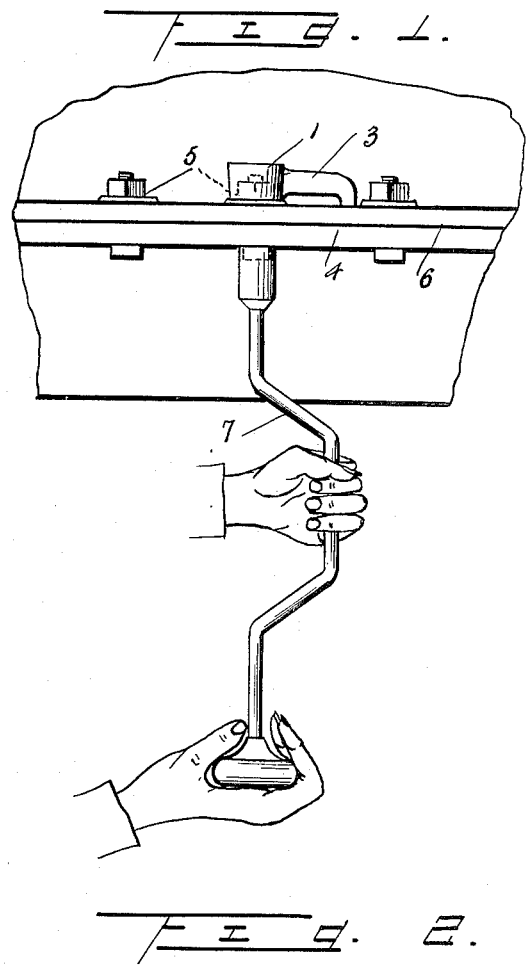

1,431,832

UNITED STATES PATENT OFFICE.

COURTNEY A. MILLS AND JESSE G. BAKER, OF ASHEVILLE, NORTH CAROLINA.

NUT HOLDER.

Application filed April 27, 1920. Serial No. 377,073.

*To all whom it may concern:*

Be it known that we, COURTNEY A. MILLS and JESSE G. BAKER, citizens of the United States, residing at Asheville, in the county of Buncombe and State of North Carolina, have invented certain new and useful Improvements in a Nut Holder; and we do hereby declare the following to be a full, clear, and exact description of the invention, such as will enable others skilled in the art to which it appertains to make and use the same.

This invention relates to holders adapted to be applied to a nut for retaining the same against the turning movement when the bolt is being screwed into the same or removed therefrom and it consists in the novel features hereinafter described and claimed.

An object of the invention is to provide a nut holder of simple and durable form adapted to be applied to the nut and including a head portion having a socket adapted to receive the nut and a laterally disposed shank portion with an angularly disposed extremity adapted to bear against the edge of a frame or other support upon which the nuts and bolt are being disposed and hold the nut against turning movement while the bolt is being applied or removed.

The device is especially adapted to be used for holding the nuts against turning movement upon automobile engines when the bolts are being applied or removed and thereby making it possible for a single operator to remove or apply the bolts without the presence of and the aid of an assistant.

In the accompanying drawing:

Figure 1 is a side view of a portion of an engine illustrating the nut holder applied to one of the nuts thereof and indicating the manner in which the nut holder is employed.

Figure 2 is a perspective view of the nut holder.

As illustrated in the accompanying drawing the nut holder comprises a portion 1 which is provided with a recess or socket 2 adapted to receive the nut. The head portion 1 is provided at one side with a laterally disposed shank portion 3 which is located between the ends of the head portion and the shank portion is provided with an angularly disposed extremity 4 the end of which is located beyond the side of the head 1 and spaced therefrom.

When in use the nut holder is applied to a nut and the nut which is indicated at 5 in Figure 1 is received in the socket 2 and the side of the extremity 4 bears against the flange 6 of the engine frame or any other adjacent and fixed support, the bolt turning tool is indicated at 8 and is applied to the head of the bolt in a usual manner.

When the parts are applied as indicated and while the device is being used the extremity 4 bearing against the edge of the flange 6 will prevent the nut from turning while the bolt is being rotated therein during the operation of applying or removing the bolt from the nut. Consequently a single operator may easily and quickly remove the bolt from the nut without the aid of any assistance for holding the nut against turning movement, as is the general practice.

From the foregoing description taken in conjunction with the acompanying drawing it will be seen that a nut holder of simple and durable form is provided and the same will effectually hold the nut against turning movement during the operation of applying or removing a bolt from a nut.

Having described the invention, what we claim is:—

1. A nut holder having a nut receiving socket, an arm integral with the socket, said arm having its free terminal portion angularly disposed, said terminal portion adapted to rest on the member carrying the bolt and nut, and said arm adapted to abut a support to prevent the nut rotating.

2. A holder for a bolt carrying a nut mounted on a surface having an angular wall, comprising a body having a nut receiving opening, an arm integral with the body, said arm having its free terminal portion angularly disposed and adapted to rest on the surface, and said arm adapted to abut the angular wall to prevent the nut rotating.

In testimony whereof we affix our signatures in presence of two witnesses.

COURTNEY A. MILLS.
JESSE G. BAKER.

Witnesses:
S. K. DAVIDSON,
CLINTON K. HUGHES.